Patented Jan. 2, 1940

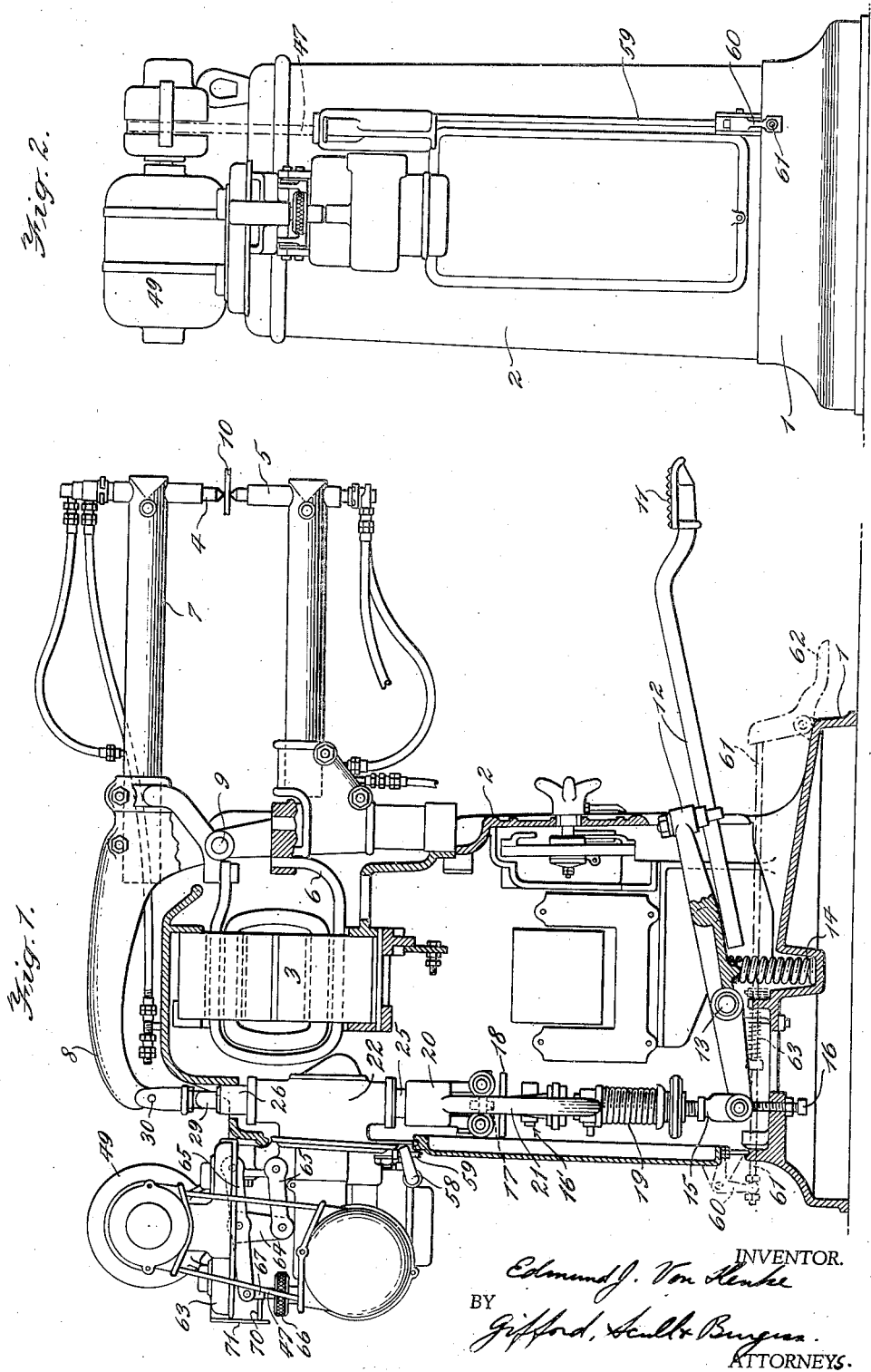

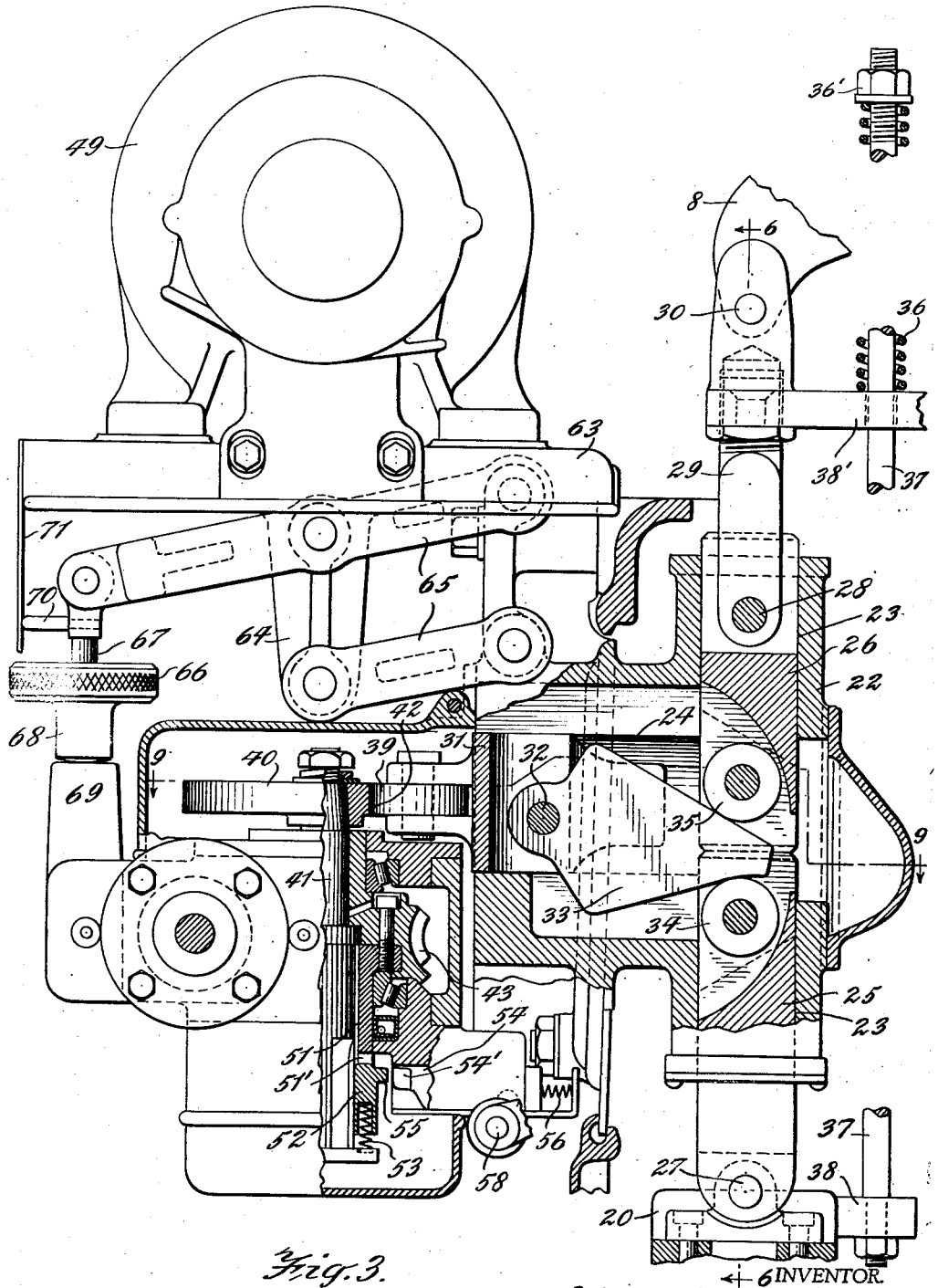

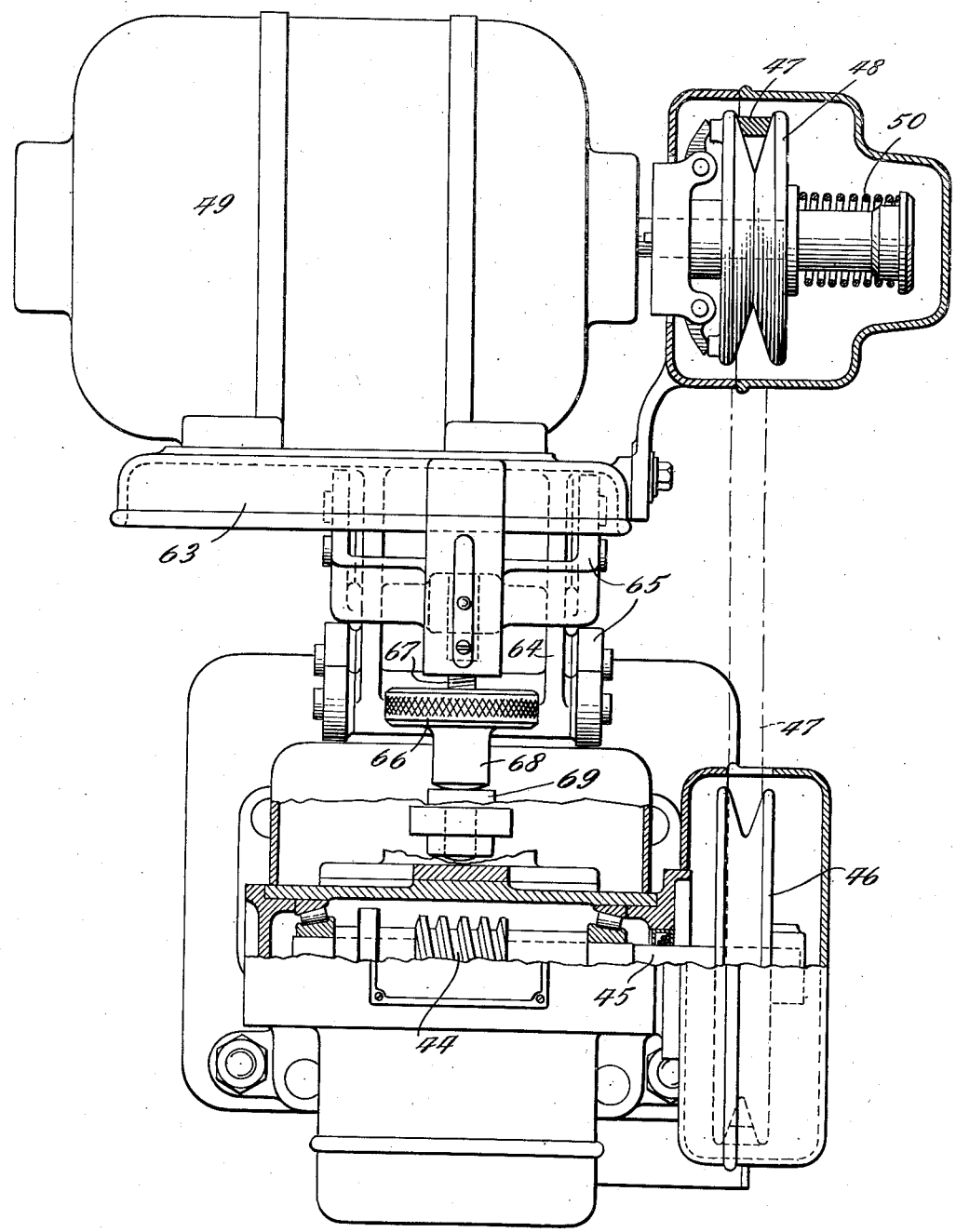

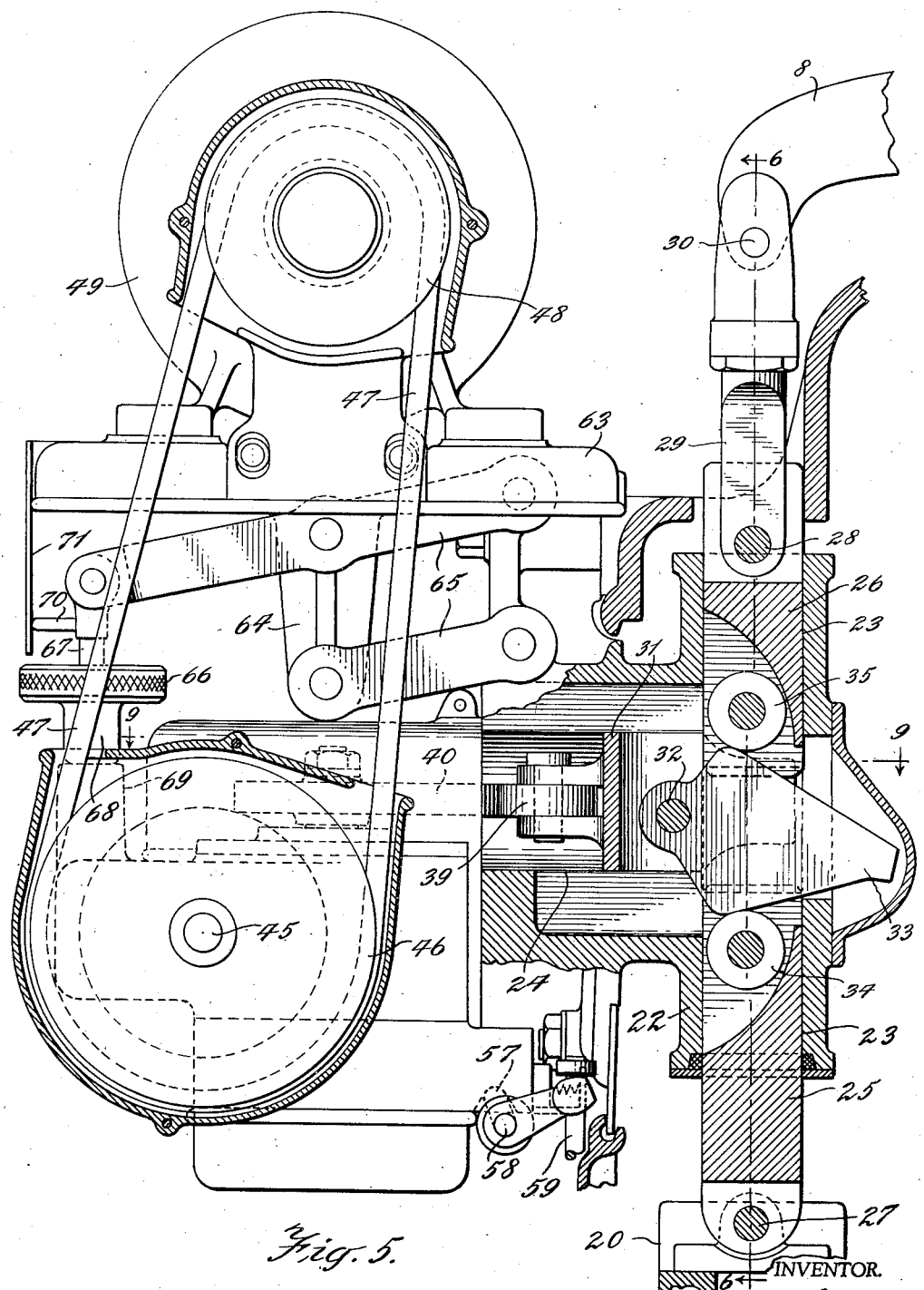

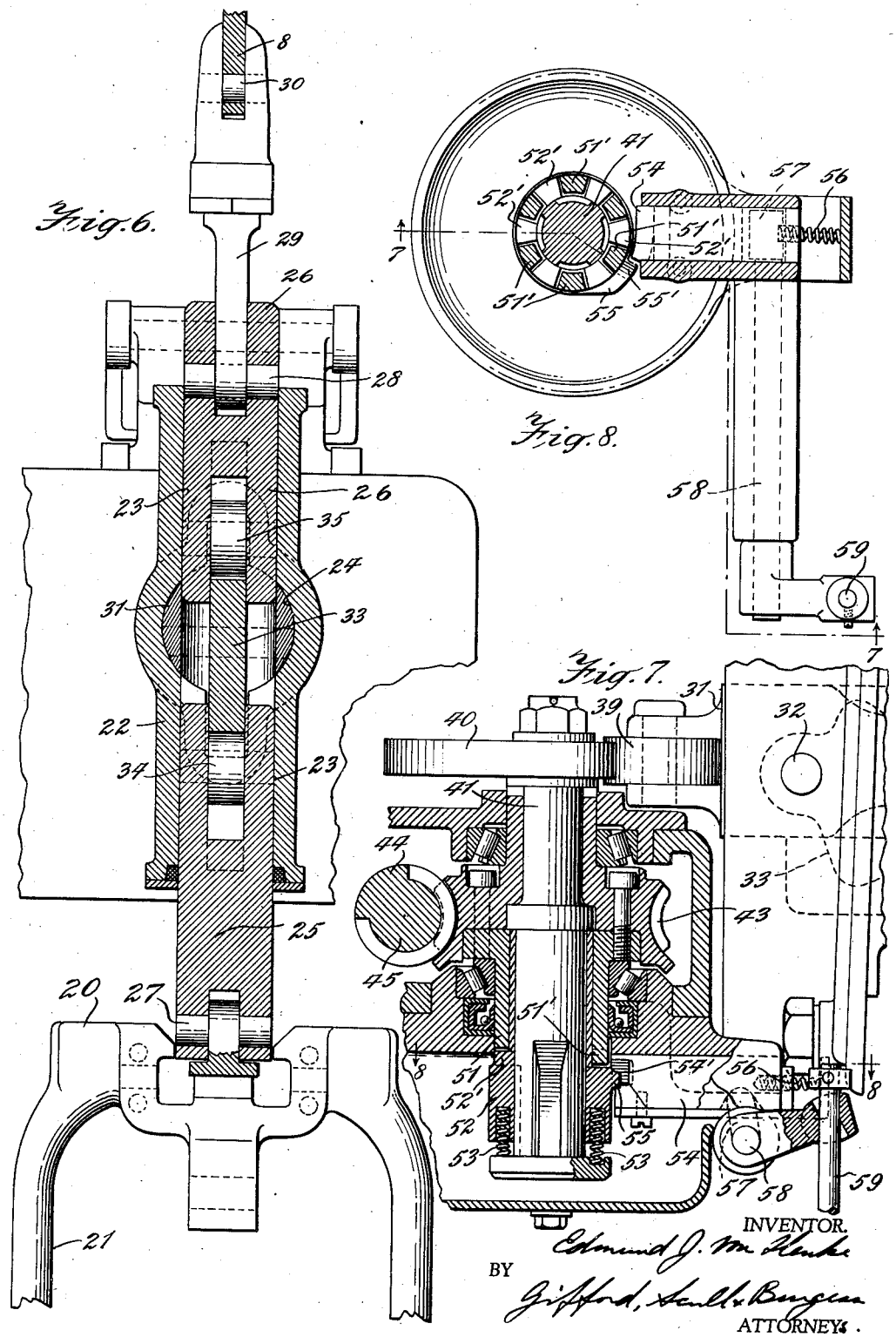

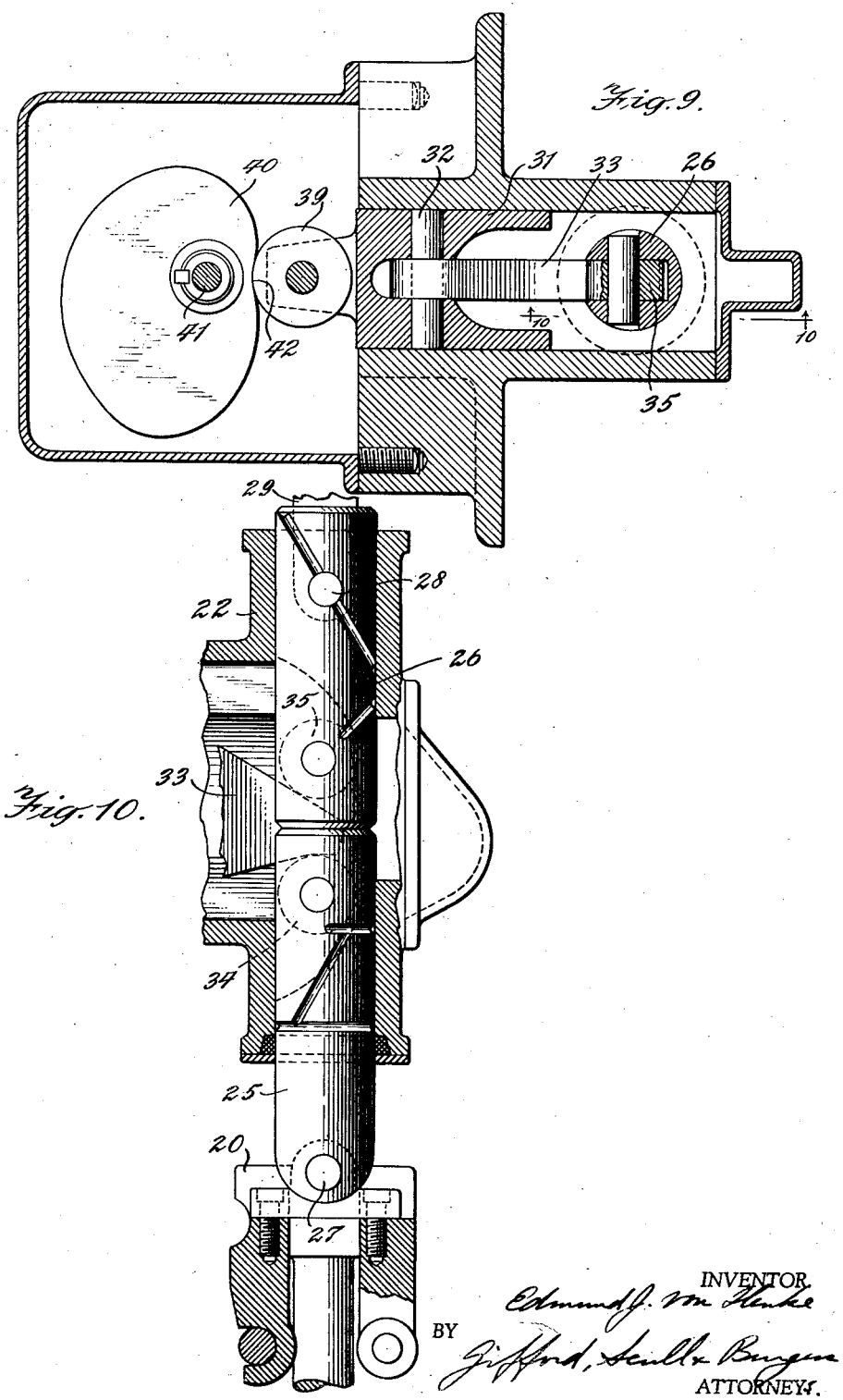

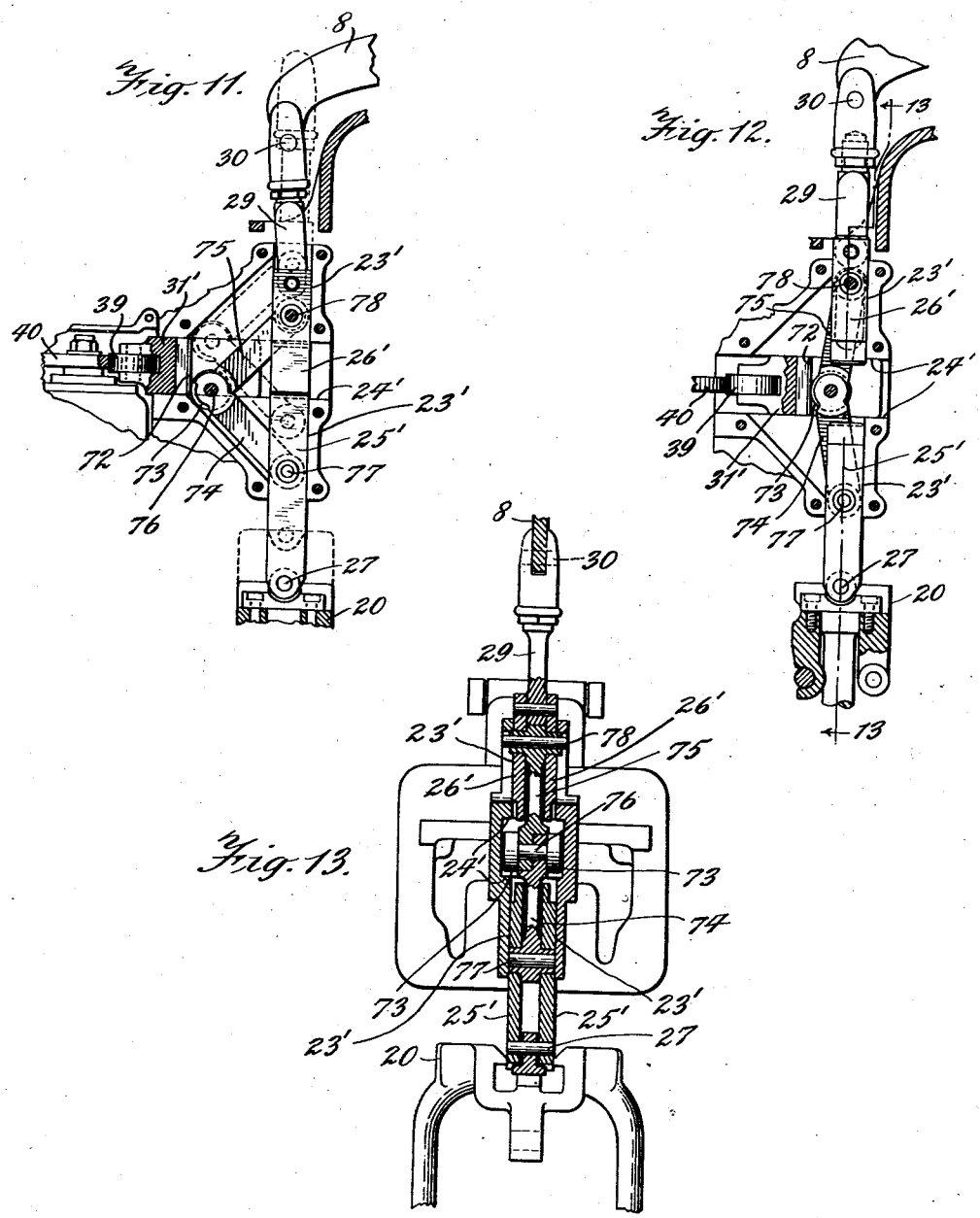

2,185,716

UNITED STATES PATENT OFFICE 2,185,716

WELDING MACHINE

Edmund J. von Henke, Chicago, Ill., assignor to American Electric Fusion Corporation, Chicago, Ill., a corporation of Illinois Application July 17, 1937, Serial No. 154,116

13 Claims. (Cl. 219—4)

This application is a continuation in part of my co-pending application Ser. No. 99,219, filed September 3, 1936. The invention relates to a novel and improved form of welding machine, the novel features of which will be best understood from the following description and the annexed drawings, in which I have shown selected embodiments of the invention and in which:

Fig. 1 is a view, partly in side elevation and partly in section, showing a machine having my invention applied thereto;

Fig. 2 is a view of the structure appearing in Fig. 1 as seen from the left of that figure;

Fig. 3 is a view on an enlarged scale, partly in section and partly in elevation, and showing the motor driven means for operating the machine;

Fig. 4 is a view taken at right angles to Fig. 3, showing some of the parts in Fig. 3 as seen from the left of that figure, parts being shown in section and other parts being omitted for the sake of clearness;

Fig. 5 is a view similar to Fig. 3 but showing certain parts in different positions;

Fig. 6 is a view approximately on the line 6—6 of Fig. 5;

Fig. 7 is a view approximately on the line 7—7 of Fig. 8 and showing the clutch and its operating mechanism;

Fig. 8 is a view approximately on the line 8—8 of Fig. 7;

Fig. 9 is a view approximately on the line 9—9 of Fig. 3;

Fig. 10 is a view approximately on the line 10—10 of Fig. 9;

Fig. 11 is a vertical elevation showing a different means for actuating the rocker arm;

Fig. 12 is a view similar to Fig. 11 but showing certain parts in different positions;

Fig. 13 is a view approximately on the line 13—13 of Fig. 12.

The machine illustrated herein is a spot welder of the type shown in my prior Patent No. 2,031,082, which in turn is operated by a switch, such as shown in my prior Patent No. 1,843,937. For the purpose of convenience of illustration, the same type of welder is shown herein, although it is to be understood that the invention is not limited to that particular type of mechanism, but can be used with any other welding machine where it is found applicable.

In the illustrated embodiment of the invention, the welding machine comprises a base 1 supporting a housing 2 within which is supported a transformer 3 adapted to supply electric current to the two welding electrodes 4 and 5, this current being supplied from the secondary 6 of the transformer.

In normal operation, the electrode 5 is relatively stationary and the electrode 4 is movable towards and away from the electrode 5. In order to obtain this movement, the electrode 4 is mounted upon a horn 7 which is secured to a rocker arm 8 pivoted at 9 on the machine. The electrodes 4 and 5 are shown as contacting with the work 10 which may be held therebetween by any suitable means, not shown, and the electrode 4 may be brought into and out of this operative position by rocking the arm 8 upon its pivot 9. This may be done by manual means exemplified by a treadle 11 adapted to rock a treadle arm 12 on its pivot 13. This treadle arm is normally held in the uppermost position shown in Fig. 1 by means of a compression spring 14, but may be depressed against the action of this spring by the treadle 11. When depressed, it will raise a vertically extending connecting member 15 whose downward movement is limited by an adjustable stop 16. This vertically extending connecting member is joined to the rocker arm 8 by suitable connections, which will be described more in detail presently, but which will serve to lift the left-hand end of the rocker arm as it appears in Fig. 1, and lower the electrode 4 into engagement with the work.

The connections between the elements 15 and 8 also include an electric switch designated generally by the numeral 16' and the details of which will not be described herein, since this may, for example, follow the details shown in my aforesaid Patent 1,843,937. For the purpose of understanding the present invention, it will be sufficient to say that the switch includes contact members 17 and 18 and that the parts are so arranged that the electrode 4 is brought into contact with the work and sufficient pressure is exerted thereon and then a spring 19 will cause the two contacts to engage with each other. These contacts are in a circuit which will supply electric current to the transformer and thus to the electrodes. The details of the circuit have been omitted from this application, since obviously a suitable circuit may be readily provided by anyone skilled in the art.

Sometimes it is desirable to operate a welding machine by a motor. For example, a spot welder of the type selected for an illustrated embodiment may be used to weld perhaps one small job where only one spot weld is needed. For such purposes, obviously the manually operated means described above is sufficient. However, if the same machine is to be used to perform a large number of welds, it is more efficient to have the work done by a motor drive, as will be apparent to those skilled in the art. I have devised a motor drive which can be used and which will now be described more in detail, this drive performing all the functions which are performed by the manual means, but operating independently of the manual means.

The switch 16' comprises a head 20 which is movable vertically upon operation of the treadle, by means of a frame 21 also forming part of the switch.

Disposed above the head 20 in fixed position in the housing is a casing 22 having two aligned vertical guideways 23 and horizontal guideways 24. Slidably mounted in the guideways 23 are aligned stems 25 and 26, the stem 25 being pivoted to the head 20 at 27, as best shown in Fig. 6. The stem 26 is pivoted at 28 to a link 29 which is pivoted at 30 to one end of the rocker arm 8.

Slidably mounted in the guideway 24 is a traveler 31 having pivoted at 32 thereon a wedge 33 which is adapted to pass between rollers 34 and 35 mounted, respectively, on the two stems 25 and 26. As best shown in Fig. 6, these rollers are preferably mounted in vertically extending slots in the two stems 25 and 26, these slots being of substantially the same width as the thickness of the wedge 33 so that the wedge is guided by the walls of the slots throughout its movement. At the same time, the opposite walls of the slots form convenient bearings for the pivots upon which the rollers are rotatably mounted.

The two stems 25 and 26 are normally urged towards each other so that the rollers contact the opposite faces of the wedge, by means of a spring 36 surrounding a rod 37 which is secured to an arm 38 fixed on the head 20 and which passes through an arm 38' which moves with the stem 26. As the stems are forced apart, it will be seen that the spring 36 is compressed against the nut 36' and that it will tend to force the rollers always against the opposite faces of the wedge and will cause the stems to move towards each other. The action of the spring supplements the weight of the rocker arm and associated parts which may be enough in itself to cause the rollers to stay in contact with the wedge. However, the spring provides an additional means to insure the desired operation.

It will be noted that the wedge has a lower face arranged more nearly horizontally than the upper face and that the two faces of the wedge are so arranged with respect to its pivot that, as the wedge is forced between the two rollers, the upper roller will be given a greater movement than the lower roller. The wedge is moved by means of the engagement of the roller 39 on the back of the traveler, with a cam 40. This cam is rotatably mounted on a vertical shaft 41 and it is of such shape that when the parts are in the position shown in Fig. 3 the roller is received in a recess 42 in the cam which serves to prevent accidental motion of the traveler. The shaft 41 is rotatably mounted in a worm gear 43 meshing with a worm 44 on a shaft 45 to which is secured a pulley 46 engaging a belt 47 which in turn runs over a pulley 48 on the shaft of a motor 49. The pulley 48 is preferably in two parts so that it may expand and permit the belt 47 to move towards and away from the center of the motor shaft against the action of a spring 50. For the purpose of this invention, I prefer to use the type of pulley more fully described and claimed in the Watson Patent No. 2,120,383, granted June 14, 1938.

Normally, the worm 44 will rotate the gear 43 without imparting any motion to the shaft 41, this shaft being held stationary by the fact that the roller 39 is in the recess 42 of the cam, thus avoiding creeping of the cam. Secured to the gear 43 is a clutch element 51 having teeth 51' adapted to engage with teeth 52' of a mating clutch element 52 which is splined upon the lower end of the shaft 41. The clutch elements are normally urged towards each other by springs 53, so that they occupy the positions shown in Figs. 7 and 8. They may be forced apart by means of a dog 54 slidably mounted on the machine and adapted to engage a projection 55 on the clutch element 52. This dog is lightly urged towards the clutch element by means of a spring 56, but is positively operated by an arm 57 mounted on a rock shaft 58 which is rocked by a trip rod 59. The rod 59 at its lower end is connected to one arm of a bell crank lever 60, the other arm of which is connected to a rod 61 operated by a treadle 62 (Fig. 1). The rod 61 is normally urged towards the left by a compression spring 63.

In operation, and assuming that the machine is to be operated manually, the motor may be turned off, it of course being understood that the motor is provided with the usual switch for turning the motor on and off as desired. As described later, means is provided so that whenever the motor drive is stopped, the parts will be in the positions shown in Fig. 3 wherein the ends of the stem 25 and 26 are in contact with each other and in which position they are held by the weight of the rocker arm and associated parts aided by the spring 36.

Manual operation may now take place by means of depression of the treadle 11 and the resulting upward movement of the stem 25, which movement in turn is transmitted to the stem 26. When the foot of the generator is taken off the treadle 11, then the weight of the parts aided by the spring 36 will cause the parts to return to initial position by downward movement of the stems 25 and 26. This movement is aided by the springs 14 and 19. During this up and down movement of the stems 25 and 26, the wedge 33 may pivot freely on its pivot 32 so that it does not interfere in any way with the manual operation of the machine. During the upward movement of the stems, the roller 34 will be received in the curved part of the lower edge of the wedge.

Now assuming that the machine is to be operated with the motor drive described above, then the motor is turned on and may be permitted to run indefinitely while the welding operations are taking place.

Assume that the work 10 is to have a series of spot welds formed thereon while the work is passing between the electrodes. It will be seen that normally the spring 63 will urge the rod 61 towards the left of Fig. 1 and consequently will urge the rod 59 downwardly so as to withdraw the dog 54 from engagement with the projection 55. The result will be that the clutch elements 51 and 52 will be in engagement and the cam 40 will be continually rotating. At each rotation, the cam will actuate the wedge to move the various elements from the positions shown in Fig. 3 to those shown in Fig. 5 or, in other words, to move the electrode 4 into engagement with the work, after which the parts will be returned to the position shown in Fig. 3, which represents a position of the electrode 4 out of engagement with the work. As the parts move from the position shown in Fig. 3 to those shown in Fig. 5, it will be seen that the stem 26 moves more than the stem 25 because of the shape and arrangement of the wedge 33. It will also be seen that the lower surface of the wedge 33 is curved near the apex of the wedge, the entire design of the wedge and its relation to the other parts being such that there is relatively little pivotal movement of the wedge on its pivot 32.

The above described operations will be repeated indefinitely as long as the motor is permitted to run, and the work may be fed through the welding position between the electrodes so that a succession of welding operations may be performed thereon. It will be seen that the action is entirely independent of the manual operation described above. Any movement of the rocker arm caused by the wedge does not affect the manual operating means in any manner. The wedge merely moves the stem 25 downwardly, enough to close the switch 16', this closing of the switch taking place after the rocker arm has been moved up to bring the electrodes into contact with the work and exert the desired pressure thereon.

Now assume that the operator desires to stop the repeated operation of the machine momentarily for any reason at all. He then depresses the treadle 62, which will cause raising of the rod 59 and release of the dog 54 which will then be moved by its spring 56 into position wherein the dog will engage the projection 55. The dog and the projection are provided with inclined surfaces 54' and 55' which engage each other so as to cam the element 52 downwardly, and then the projection 55 will engage beneath the dog 54 and the element 52 will be held definitely out of engagement with the element 51.

The dog 54 and projection 55 are so located that, when the clutch elements are disengaged, it is at a point such that the roller 39 will be at the recess 42 of the cam 40, as shown in Fig. 9. This in turn means that the traveler 31 will be in the position shown in Figs. 3 and 7, and the stems 25 and 26 consequently will have their adjacent ends in contact with each other, so that the machine may be operated manually, if desired. Furthermore, the parts are so situated that the electrode 4 is raised out of operative position. It will thus be seen that the means described above insures that, when the motor drive ceases operation, the parts shall always be in correct position for manual operation.

The parts also are so designed that, during the operation of the motor drive, and after the electrodes are brought into contact with the work, a further movement of the traveler 31 towards the right takes place, and this movement acts, first, to increase the pressure of the electrodes on the work and then to move the head 20 downwardly to operate the switch 16'.

When pressure on the treadle 62 is removed, the parts will return to normal position, wherein the dog 54 will permit the engagement of the clutch elements. For the purpose of convenience in illustration, the parts are shown in the positions which they occupy when the dog 54 is about to engage the projection 55. The recess 42 in the cam tends to center the roller 39 positively in position so that the ends of the stems 25 and 26 will positively engage each other.

When the cam is engaging the roller at the high spot of the cam, the tendency is to speed up the motor, this being caused at least in part by the spring-pressed load acting against the cam. This tendency, however, is offset by the construction of the pulley 48, the parts of which will move away from each other as the belt tightens. The motor is mounted upon a bracket 63 which is supported on an arm 64 which is pivoted to two arms 65 pivotally mounted on the frame of the machine. The arms 64 and 65 and the frame of the machine together form a parallelogram, as plainly shown in Figs. 3 and 5, and therefore a truly vertical movement of the motor is obtained. This movement is controlled by an adjustment nut 66 which is threaded on a stem 67 pivoted to the upper arm 65, and the nut has a neck 68 which bears against a stop 69 on the frame of the machine. The stem 67 is loosely received in the stop 69 so that the neck 68 and the weight that it carries rests directly on the stop 69, but turning of the screw 66 may raise or lower the motor with respect to the pulley 46. The amount of adjustment may be measured by the relation of a pointer 70 to a scale 71 (Fig. 5), and the movement of the motor may be used to vary the speed of operation, since it will be apparent that as the pulley 48 is raised, the parts of that pulley will be spread apart.

By using the arrangement shown, it is possible, even though a constant speed motor is used, to obtain the desirable variable speed of movement of the movable electrode 4. Numerous other advantages have been pointed out above or will be evident to those skilled in the art.

Referring now to Figs. 11, 12, and 13, I have shown therein another way of operating the rocker arm which may be used in place of the wedge construction previously described. The cam 40 and roller 39 are used as before, but the traveler 31' is provided with a vertical track 72 engaging a roller 73 at the knuckle of a toggle which comprises two toggle arms 74 and 75 pivoted at 76 and pivotally engaging the stems 25' and 26' at 77 and 78, respectively. Other numerals appearing in Figs. 11, 12, and 13 designate parts identical or equivalent with those previously described, and these parts will not be further described, these numerals being primed where the parts are slightly different in construction.

The device shown in Figs. 11, 12, and 13 may be operated manually, since the stems 25' and 26' will be in engagement when the roller 39 engages the low point of the cam 40, as in Fig. 9, and thus manual operation will be achieved in the same way as previously described. As the parts move between the full line and dotted line positions shown in Fig. 11, the roller 73 will move along the track 72 on the traveler 31', while, when the cam 40 is operated by the motor, the parts will move back and forth between the position shown in Fig. 11 and that shown in Fig. 12, downward movement of the head 20 resulting in closing of the switch to supply welding current.

I believe that the operation of the arrangement shown in Figs. 11, 12, and 13 will be apparent from the above description.

The stems 25' and 26' are preferably made in two parts, as shown in Fig. 13, and the pivot 78 is preferably in the form of a pin received in guideways in the casing, as indicated in Fig. 13.

While I have shown the invention as embodied in specific forms, it is to be understood that various changes in details may be made without departing from the scope of the invention, as defined by the appended claims.

I claim:

1. In an electric welding machine comprising two electrodes, one movable towards and away from the other, manually operable means for moving the movable electrode into and out of operative relation to the other electrode and including two stems with their ends in contact and one adapted to push the other to move the movable electrode into said operative relation, a wedge disposed between said stems and adapted to force their ends out of contact with each other but inoperative during manual operation of the machine, a motor, means operated by the motor to reciprocate the wedge, first to move it into position to force said stems out of contact with each other and then into position to permit their movement into contact with each other, and means causing said ends to move into contact with each other during said second movement of the wedge.

2. In an electric welding machine comprising two electrodes, one movable towards and away from the other, manually operable means for moving the movable electrode into and out of operative relation to the other electrode and including two stems with their ends in contact and one adapted to push the other to move the movable electrode into said operative relation, a wedge disposed between said stems and adapted to force their ends out of contact with each other but inoperative during manual operation of the machine, a motor, means operated by the motor to reciprocate the wedge, first to move it into position to force said stems out of contact with each other and then into position to permit their movement into contact with each other, means causing said ends to move into contact with each other during said second movement of the wedge, and means to stop reciprocation of the wedge with said stems in contact with each other.

3. In an electric welding machine comprising two electrodes, one movable towards and away from the other, manually operable means for moving the movable electrode into and out of operative relation to the other electrode and including two parts engaging each other, a motor, means operable by said motor to disengage said parts and to move said movable electrode into and out of operative relation to the other electrode, a clutch forming part of said motor-operable means, and means to disengage said clutch only when said two parts are in engagement.

4. In an electric welding machine comprising two electrodes, one movable towards and away from the other, manually operable means for moving the movable electrode into and out of operative relation to the other electrode and including two stems with their ends in contact and one adapted to push the other to move the movable electrode into said operative relation, a wedge disposed between said stems and adapted to force their ends out of contact with each other but inoperative during manual operation of the machine, a motor, means operated by the motor to reciprocate the wedge, first to move it into position to force said stems out of contact with each other and then into position to permit their movement into contact with each other, means causing said ends to move into contact with each other during said second movement of the wedge, a clutch between said motor and wedge, and means to disengage said clutch only when said stem ends are in contact.

5. In an electric welding machine comprising two electrodes, one movable towards and away from the other, manually operable means for moving the movable electrode into and out of operative relation to the other electrode and including two stems with their ends in contact and one adapted to push the other to move the movable electrode into said operative relation, a wedge disposed between said stems and adapted to force their ends out of contact with each other but inoperative during manual operation of the machine, a motor, and a cam rotatable by said motor and adapted to actuate said wedge.

6. In an electric welding machine comprising two electrodes, one movable towards and away from the other, manually operable means for moving the movable electrode into and out of operative relation to the other electrode and including two stems with their ends in contact and one adapted to push the other to move the movable electrode into said operative relation, a wedge disposed between said stems and adapted to force their ends out of contact with each other but inoperative during manual operation of the machine, a motor, a cam rotatable by said motor and adapted to actuate said wedge, and means causing said cam to stop its rotation only when said stem ends are in contact.

7. In an electric welding machine comprising two electrodes, one movable towards and away from the other, manually operable means for moving the movable electrode into and out of operative relation to the other electrode and including two stems with their ends in contact and one adapted to push the other to move the movable electrode into said operative relation, a wedge disposed between said stems and adapted to force their ends out of contact with each other but inoperative during manual operation of the machine, a roller rotatably mounted on said wedge, a motor, a cam rotatable by said motor and engaging said roller to actuate said wedge, said cam having a recess therein, and means causing said cam to stop its rotation only when said roller is in said recess.

8. In an electric welding machine comprising two electrodes, one movable towards and away from the other, manually operable means for moving the movable electrode into and out of operative relation to the other electrode, a constant-speed motor, and a variable speed drive between said motor and said movable electrode and independent of said manual means and operable by said motor to move said movable electrode at a variable speed and with varying pressure into and out of operative relation to the other electrode, the speed of said drive being varied by the load imposed thereon in moving said movable electrode.

9. In an electric welding machine comprising two electrodes, one movable towards and away from the other, manually operable means for moving the movable electrode into and out of opertive relation to the other electrode, a motor, means independent of said manual means and operable by said motor to move said movable electrode into and out of operative relation to the other electrode, said last-named means comprising a cam adapted to move said electrode at a variable speed, and a variable speed driving connection between said motor and cam and responsive to the load imposed on said cam in moving said movable electrode.

10. In an electric welding machine comprising two electrodes, one movable towards and away from the other, manually operable means for moving the movable electrode into and out of operative relation to the other electrode and including two parts operatively connected to each other and one connected to said movable electrode, a motor, means operable by said motor to disconnect said parts and to move said one part away from the other part to move said movable electrode into operative relation to the other electrode, means to reconnect said parts and means to stop said movement of said one part only when the two parts are connected.

11. In an electric welding machine comprising two electrodes, one movable towards and away from the other, manually operable means for moving the movable electrode into and out of operative relation to the other electrode and including two parts operatively connected to each other and one connected to said movable electrode, a motor, means operable by said motor to disconnect said parts and to move said one part away from the other part to move said movable electrode into operative relation to the other electrode and then to move said other part away from said one part, and a switch controlling the supply of electric current to said electrodes and constructed and arranged to be closed by said movement of said other part.

12. In an electric welding machine comprising two electrodes, one movable towards and away from the other, two stems having their ends in contact with each other, manually operable means connected to one of said stems and adapted to actuate it to push the other stem, means connecting said other stem to said movable electrode and adapted to move said movable electrode towards the other electrode when said one stem pushes said other stem, mechanism inoperative during manual operation and adapted to move said other stem away from said one stem to move said movable electrode towards the other electrode, a motor, means controlled by said motor to operate said mechanism, and means to return said other stem into contact with said one stem.

13. In an electric welding machine comprising two electrodes, one movable towards and away from the other, two stems having their ends in contact with each other, manually operable means connected to one of said stems and adapted to actuate it to push the other stem, means connecting said other stem to said movable electrode and adapted to move said movable electrode towards the other electrode when said one stem pushes said other stem, mechanism inoperative during manual operation and adapted to move said other stem away from said one stem to move said movable electrode towards the other electrode, a motor, means controlled by said motor to operate said mechanism, means to return said other stem into contact with said one stem, and means to stop the operation of said mechanism only when said stems are in contact.

EDMUND J. von HENKE.